Feb. 26, 1963  D. J. IAQUINTA  3,078,901
TIRE
Filed Nov. 9, 1961

INVENTOR.
DOMINIC J. IAQUINTA
BY
Arthur H. Seidel
ATTORNEY.

United States Patent Office 3,078,901
Patented Feb. 26, 1963

3,078,901
TIRE
Dominic J. Iaquinta, 3811 N. 7th St., Philadelphia, Pa.
Filed Nov. 9, 1961, Ser. No. 151,218
7 Claims. (Cl. 152—210)

This invention relates to a tire, and more particularly, to a tire capable of having a chain unit readily secured thereto so that the tire may be utilized more efficiently when snow is on the ground or supporting surface.

The tire of the present invention may be of conventional construction as pertains to the side walls, materials, and tread design. Thus, the tire of the present invention may be what is commercially known as a "snow tread" tire. The tire of the present invention is provided with a plurality of transverse channels at spaced points along the tread portion of the tire. By "transverse" is mean that the channels extend in a direction which is substantially perpendicular to the mid-circumferential plane of the tire. The channels are recessed below the ground engaging surface of the tread portion of the tire.

Chain units of unique design are selectively and removably applied to the tire by inserting a portion of the chain unit into the channel. The chain units have a length which is substantially equal to the distance across the tread portion. When the chain units are disposed in an operative relationship, a chain on the chain unit will project beyond the periphery of the tread portion in a radial direction on the tire. Accordingly, the chain will be disposed to provide the necessary traction when riding on snow.

The chain units of the present invention are slidably inserted into the channel from one end thereof. Accordingly, the chain units of the present invention may be rapidly applied to the tire without jacking the rear end of the car upwardly. As is well known, the process of jacking the rear end of the car upwardly, so that conventional tire chains may be applied thereto is a cumbersome operation. The ends of the chain unit are provided with flanges which are disposed within grooves on end walls. One of the end walls is extremely flexible so that it may be bent by means of a screwdriver or the like so that the chain unit may be inserted into the end of the channel and then pushed to a position where it extends across the tread portion of the tire. The application of each individual chain unit will require only approximately ten seconds depending upon the dexterity of the person applying the same.

It is an object of the present invention to provide a novel tire.

It is another object of the present invention to provide a tire designed to accommodate readily removal chain units.

It is another object of the present invention to provide a tire which facilitates the use of chain units having a length corresponding to approximately the width of the tread portion of the tire.

It is another object of the present invention to provide a tire adapted to accommodate chain units which slide on and off the tire in a direction substantially perpendicular to the mid-circumferential plane of the tire.

It is still another object of the present invention to provide a chain unit for a tire which may be applied to a tire more readily than those proposed heretofore.

Other objects will appear hereinafter.

For purpose of illustrating the invention there is shown in the drawings a form which is presently preferred; it being understood, however, that this invention is not limited to the precise arrangements and instrumentalities shown.

Figure 1:
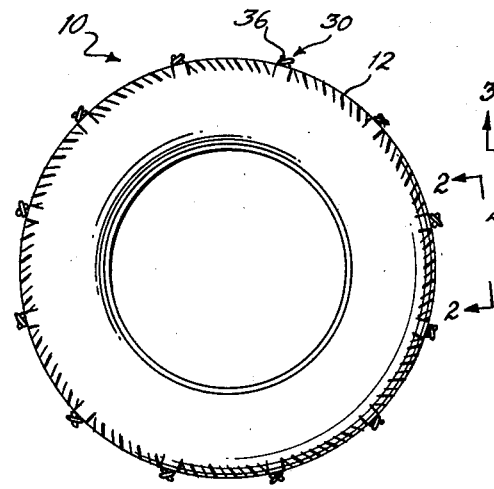
FIGURE 1 is an elevation view of a tire in accordance with the present invention.
Figure 2:
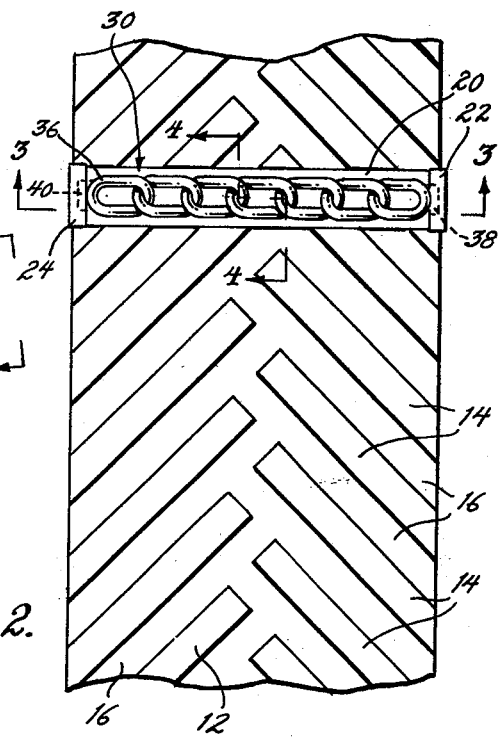
FIGURE 2 is a view taken along lines 2—2 in FIGURE 1.
Figure 4:
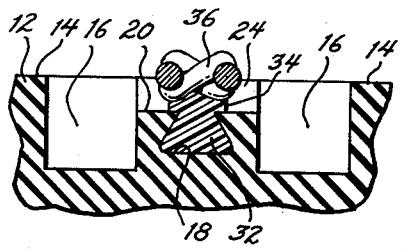
FIGURE 4 is a sectional view taken along the lines 4—4 in FIGURE 2.

Referring to the drawing in detail, wherein like numerals indicate like elements, there is shown in FIGURE 1 a tire designated generally as 10. The tire 10 is conventional as pertains to the materials, the bead design, laminated reinforcements, tread design, etc.

The tire 10 is provided with a tread portion 12 having lands 14 and grooves 16. The tread portion may be of the type utilized on snow tires. A plurality of channels 18 are provided at spaced points around the tread portion 12 of the tire 10. As illustrated, twelve channels are provided. It will be obvious that a greater or lesser number of channels may be provided as desired.

The channels 18 are located at a point between the lowermost surface of the grooves 16 and the outer peripheral surface of the tread portion 12. Each channel 18 is provided with a shape corresponding to a truncated triangle with the truncated portion of the triangle being radially outwardly of the base portion. The channels 18 extend transversely across the tread portion 12.

Each channel 18 merges into a shoulder 20. The shoulder 20 lies in a plane which is substantially parallel to the plane of the outer peripheral surface of the tread portion 12. End walls 22 and 24 are provided on opposite ends of the channels 18. The end walls 22 and 24 extend for a height sufficient so that they form a continuation of the tread portion 12. The end wall 22 is provided with a notch 26 for a purpose to be made clear hereinafter. The end wall 24 is provided with a notch 28 for a purpose to be made clear hereinafter.

A chain unit designated generally as 30 is adapted to be received in a separate one of the channels 18. Each chain unit 30 has a length corresponding to substantially the transverse dimensions of the tread portion. Preferably, the chain unit 30 has a length slightly less than the width of the tread portion 12. Each chain unit 30 includes a base 32 having a shape of a truncated triangle in transverse cross section. The transverse dimensions of the base 32 are slightly smaller than the dimensions of the channels 18. The base 32 may be made from any one of a variety of materials including metals and plastics. As illustrated, the base 32 is made from a plastic material such as nylon so that it may have a certain amount of flexibility even in cold weather. Flexibility of the base 32 is desired so that the base 32 may become planar when the tire 10 becomes slightly deflated.

A flange 34 extends from the sides of the base 32. The flange 34 is in abutting engagement with the shoulder 20. A chain 36 formed from metal links is fixedly secured to the base 32 and has a length corresponding to the length of the base 32.

If the base 32 is made from metal, the chain 36 may be secured thereto by welding or the like. When the base 32 is made from a plastic material such as nylon, the chain 36 may be secured thereto in any one of a variety of manners. For example, the chain 36 may be fused to the nylon base. Alternatively, the chain 36 may be secured to the base 32 by discrete fastening elements. A flange 38 extends from one end of the base 32 and a flange 40 extends from the other end of the base 32. Flange 38 is adapted to be received in the notch 26 in the end wall 22. Flange 40 is adapted to be received in the notch 28 in the end wall 24.

Figure 3:
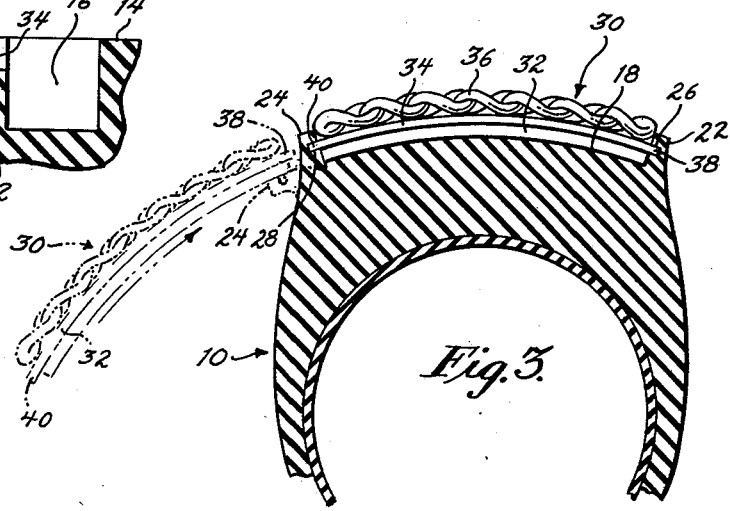
FIGURE 3 is a sectional view taken along the lines 3—3 in FIGURE 2.

As illustrated more clearly in FIGURE 3, the chain unit 30 is adapted to be inserted in a direction across the width of the tread portion 12. To facilitate insertion of the chain unit 30, the end wall 24 is sufficiently flexible so that it may be deformed by application of pressure thereagainst with a screwdriver or the like. Deformation of the end wall 24 exposes the channel 18. The base 32 is inserted into the channel 18 from one end of the channel 18. Pressure is applied to slide the chain unit 30 into the channel 18 until the flange 38 is received in the notch 26. In this regard, the end wall 22 is substantially more rigid than the end wall 24.

When the chain unit 30 has been installed, it will be noted that the mating relationship between the shape of the channel 18 and the shape of the base portion 32 prevents the chain unit 30 from being removed in a radial direction on the tire 10. Hence, the chain unit 30 may not become accidentally removed from its disposition on the tire 10. The chain unit 30 must be inserted and removed in a direction extending across the width of the tread portion 12. Such a direction is substantially perpendicular to the mid-circumferential plane of the tire 10. The large engaging surfaces between the base 32 and the base of the channel 18 and the engagement between the shoulder 20 and the flange 34 assures that the chain 36 will always extend beyond the periphery of the tread portion 12.

When the tire 10 is utilized on a vehicle, the mounting of the chain unit 30 is facilitated if the end wall 24 is on the exposed side wall of the tire. Hence, the tire 10 must be mounted on a rim so that the side of the tire illustrated in FIGURE 1 is exposed when the tire is mounted on a vehicle. In this manner, the chain units 30 may be installed without jacking the rear end of the vehicle upwardly as has been conventional heretofore. The chain units 30 may be readily installed by an unskilled person thereby alleviating the time consuming task of applying chains in the manner which has been conventional heretofore.

The present invention may be embodied in other specific forms without departing from the spirit or essential attributes thereof and, accordingly, reference should be made to the appended claims, rather than to the foregoing specification as indicating the scope of the invention.

I claim:

1. An article of manufacture comprising a tire for a vehicle, said tire having a peripheral tread portion, chain units extending only across the width of the tread portion at spaced points therealong, and means for selectively removably securing each unit to said tire, said means including channels in said tire extending across a substantial portion of the width of said tread portion at spaced points therealong, and a portion of each of said units disposed within each of said channels.

2. An article of manufacture in accordance with claim 1 wherein each of said channels is disposed radially inwardly of the surface engaging portion of the tread portion of said tire, shoulders on said tire radially outwardly of each of said channels, and a flange on each of said chain units in abutting engagement with said shoulder.

3. An article of manufacture comprising a tire for a vehicle, said tire having a peripheral tread portion, chain units extending across the width of the tread portion at spaced points therealong, means for selectively removably securing each unit to said tire, said means including channels in said tire, each channel extending across a substantial portion of said tread portion, a portion of each unit disposed within each channel, each chain unit including a metal chain secured to said portion of said unit disposed within said channel, and said portion of said unit being made from a synthetic plastic resin.

4. An article of manufacture comprising a tire for a vehicle, said tire having a peripheral tread portion, chain units extending across the width of the tread portion at spaced points therealong, means for selectively removably securing each unit to said tire, said means including channels in said tire, each channel extending across a substantial portion of said tread portion, a portion of each unit disposed within each channel, end walls on said tire at opposite ends of each channel, one of said end walls being more flexible than the other, whereby said unit may be inserted into one end of said channel by deforming said one end wall.

5. An article of manufacture comprising a tire having a tread portion, a channel on said tire, said channel extending across the width of said tread portion, and means for selectively unblocking one end of said channel so that a chain unit may be reciprocated into and out of said channel in a direction which is substantially perpendicular to the mid-circumferential plane of said tire.

6. A chain unit adapted to be utilized on a tire comprising a base portion having two parallel side faces and having a length which is not greater than the width of the tread portion of the tire on which said base portion is adapted to be installed, a chain secured to one side face of said base portion and extending along substantially the entire length of said base portion, and said base portion having a reduced transverse sectional area between said chain and the side face remote from said chain.

7. A chain unit in accordance with claim 6 wherein said base is provided with a flange extending beyond said chain, said flange lying in a plane substantially parallel to the plane of said chain.

References Cited in the file of this patent

UNITED STATES PATENTS

| | | |
|---|---|---|
| 1,265,556 | Varner | May 7, 1918 |
| 1,361,693 | Demas | Dec. 7, 1920 |
| 2,537,231 | Necrason | Jan. 9, 1951 |
| 2,603,268 | Brown | July 15, 1952 |